United States Patent [19]
Kraus

[11] 3,790,286
[45] Feb. 5, 1974

[54] CARBON BLACK TESTING BY ANALYZING NON-SPECULARLY REFLECTED POLARIZED LIGHT

[75] Inventor: Gerhard Kraus, Bartlesville, Okla.

[73] Assignee: Phillips Petroleum Company, Washington, D.C.

[22] Filed: Apr. 21, 1972

[21] Appl. No.: 246,329

[52] U.S. Cl. .............................. 356/118, 250/225
[51] Int. Cl. .................................. G01n 21/48
[58] Field of Search ..... 356/118, 210, 209; 250/225

[56] References Cited
UNITED STATES PATENTS
2,947,212  8/1960  Woods ........................... 250/225 X
3,594,085  7/1971  Wilmanns ....................... 356/118 X Primary Examiner—Ronald L. Wibert
Assistant Examiner—Paul K. Godwin
Attorney, Agent, or Firm—Quigg and Oberlin

[57] ABSTRACT

A dry reflectance test is carried out with incident light polarized in the plane of reflection and an analyzer is inserted into the remitted beam, crossed with respect to the incident radiation.

1 Claim, 1 Drawing Figure

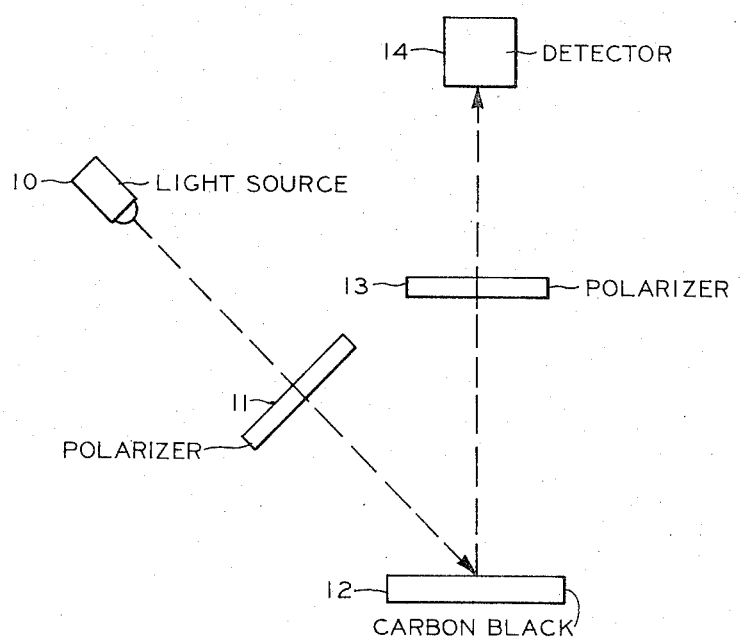

CARBON BLACK TESTING BY ANALYZING NON-SPECULARLY REFLECTED POLARIZED LIGHT

This invention relates to carbon black testing.

In one of its more specific aspects, this invention relates to the measurement of carbon black surface area.

The reflectance measurement of carbon black surface area is well known from such publications as Rubber Chemistry and Technology, 40, 1319–1329, December 1967, J. Applied Chemistry, 7, May 1957 and Rubber Chemistry and Technology, 40, 1305–1310, December 1967, the disclosures of which are incorporated herein by reference. One measurement of the dry reflectance is often referred to as the "Densichron test" because of the use of a Densichron reflectance meter in the measurement of reflectance.

This method is used for estimating the nonpore surface area of the black. Since high nonpore surface area is generally beneficial to road wear performance of the automobile tires into which the black is blended, the test serves as a useful method of approximating the overall quality of the black in this respect.

The dry reflectance test is useful because the reflectance of the black can be correlated with its surface area by the relationship $$R = a S^{-n}$$

wherein $R$ equals the reflectance, $a$ and $n$ are constants and $S$ is the nonpore surface area. Deviations of the black from the power law set out above appear to be related to morphological features so that there is incentive for improving the test method.

The dry reflectance test measures the light reflected from a specifically prepared surface of dry carbon black. The reflectance, which is in the order of less than 1 percent, can be correlated with the specific surface area. Technicians who perform the test must follow the procedure exactly and a standard black must be run with the sample whose value is to be determined. Because of the comparatively small difference between the values of the reflectance of the different carbon blacks, under conventional procedures, it is sometimes difficult to distinguish between blacks or to obtain an accurate estimate of the surface area of the black by employing the dry reflectance testing procedure. The method of this invention is directed towards a solution of this problem.

According to the method of the invention, when conducting such reflectance measurement of carbon black surface area, incident light polarized in the plane of reflection is employed. The reflected light is passed through an analyzer, or polarizer, fixed at an angle of 90° with relation to the polarizer of the incident light and thence to the reflectance detector or measuring device.

The accompanying drawing is a schematic representation of apparatus which can be employed to carry out the method of this invention.

In the drawing a beam of light from a source 10 is passed through a first polarizer 11 to impinge on a surface of carbon black 12 to be measured. A beam of remitted radiation passes through a second polarizer 13 to a detector 14. Polarizer 11 is set to polarize the incident light beam in the plane of reflection, and polarizer 13 is first at an angle of 90° with relation to polarizer 11.

In the conventional dry reflectance test, the incident angle is 45° and the remitted radiation is sampled perpendicular to the surface of the carbon black sample. However, when the remitted radiation is sampled 35° from the surface normal (80° from incidence), the dependence of the reflectance on surface area is almost reversed such that low structure, small particle blacks reflect the most light.

It has now been found that this reversal is a consequence of specular reflection, which becomes large as the specular reflectance angle for the geometric surface is approached. However, since the surface is quite rough on a microscopic scale, specular reflection from suitably oriented surface elements contributes also at the conventional optical geometry. Because specular reflection dependence on surface area appears to be opposite to that of back scattering, the principal mechanism of reflection in the dry reflectance test, specular reflection tends to "wash out" the surface area dependence. The method of the present invention minimizes the effect of specular reflection by inserting crossed polaroids into the incident and remitted beams. By doing so, the value of the exponent $n$ in the previous equation is increased with the result that the sensitivity of the method to surface area is greatly increased. For example, in the conventional test by keeping the surface area of the carbon black bed relatively rough, $n$ is maintained at a value of about two-thirds. For denser and smoother surfaces prepared by filtering black suspensions through Millipore filters, $n$ decreases to about one-third. However, when filter cakes from the Millipore filter are examined with incident light polarized in the plane of reflection and an analyzer is inserted into the remitted beam, crossed with respect to the incident radiation, the value of $n$ becomes about four-thirds.

Accordingly, the method of this invention permits more accurate correlations to be established between reflectance and surface area. Such correlations can be conveniently expressed in the form of a graph interrelating the reflectance and surface area.

However, the use of the method of the invention produces a graphical relationship, or line, having a greater slope than that resulting from the use of nonpolarized light. As a result, differences between blacks are more evident when employing the method of the invention and, hence, distinctions between blacks are more easily recognized.

This is evidenced by the following data which indicate reflectance values, in arbitrary units, for several blacks as measured employing polarized and nonpolarized light.

| Black | Surface Area, m²/g | Reflectance, Units Polarized light | Nonpolarized light |
|---|---|---|---|
| A | 34 | 9.7 | 2.5 |
| B | 49 | 7.1 | 1.9 |
| C | 92 | 2.8 | 1.6 |
| D | 135 | 1.9 | 1.3 |

The above data indicate that whereas about 1.2 units difference in reflectance existed between blacks A and D by determinations of reflectance made under prior art methods, the method of this invention produced a difference of about 7.8 units. Hence, differences between blacks are more easily discernable and interrelated to surface area when employing the method of this invention.

It will be evident from the foregoing that various modifications can be made to the method of this invention. Such, however, are considered to be within the scope of the invention.

What is claimed is:

1. A carbon black surface area measuring method which comprises passing an incident beam of light through a first polarizer onto the surface of carbon black to be measured, and passing a non-specular beam of radiation reflected from the surface through a second polarizer to a detector, said first polarizer being set to transmit light polarized in the plane of reflection and said second polarizer being set to pass light polarized at an angle of 90° with relation respect to said first polarizer, the detected radiation being a function of the surface area of the carbon black.

* * * * *

UNITED STATES PATENT OFFICE

CERTIFICATE OF CORRECTION

Patent No. 3,790,286          Dated: February 5, 1974

Gerard Kraus

It is certified that error appears in the above-identified patent and that said Letters Patent are hereby corrected as shown below:

On the cover page, the inventor's name "Gerhard" should read --- Gerard ---; column 4, line 5, delete "relation".

Signed and sealed this 17th day of September 1974.

(SEAL)
Attest:

McCOY M. GIBSON JR.
Attesting Officer

C. MARSHALL DANN
Commissioner of Patents